(12) United States Patent
Provenzano

(10) Patent No.: US 11,650,040 B1
(45) Date of Patent: May 16, 2023

(54) SNUBBER GAP MEASUREMENT TOOL

(71) Applicant: The United States of America, as represented by the Secretary of the Navy, Arlington, VA (US)

(72) Inventor: Daniel Provenzano, Philadelphia, PA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 185 days.

(21) Appl. No.: 17/305,107

(22) Filed: Jun. 30, 2021

(51) Int. Cl.
G01B 5/14 (2006.01)

(52) U.S. Cl.
CPC .................... G01B 5/14 (2013.01)

(58) Field of Classification Search
CPC ........................................ G01B 5/14
See application file for complete search history.

(56) References Cited

U.S. PATENT DOCUMENTS

| 4,813,152 | A | * | 3/1989 | Spencer | B23Q 17/2233 33/832 |
| 5,492,003 | A | * | 2/1996 | D'Anna | G01B 3/24 33/784 |
| 5,657,550 | A | * | 8/1997 | Struble | G01B 5/14 33/544.4 |
| 7,511,210 | B2 | * | 3/2009 | May | G10D 13/16 84/413 |
| 11,204,230 | B2 | * | 12/2021 | Xu | B60T 17/221 |
| 2009/0182343 | A1 | * | 7/2009 | Trudeau | A61F 2/4657 606/102 |
| 2020/0292292 | A1 | * | 9/2020 | Phin | F16L 55/00 |

* cited by examiner

Primary Examiner — Yaritza Guadalupe-McCall
(74) Attorney, Agent, or Firm — Mark J. Rosen

(57) ABSTRACT

A snubber gap measurement tool and a method for measuring snubber gaps in resilient mounts are provided. The tool has a handle, a stem, and a flag, and is sufficiently thin to fit within a resilient mount's inspection window. Upon rotation by 90 degrees the tool's flag extends within the snubber gap and thereby allows measurement of the snubber gap.

18 Claims, 2 Drawing Sheets

SNUBBER GAP MEASUREMENT TOOL

STATEMENT OF GOVERNMENT INTEREST

The invention described herein may be manufactured and used by or for the Government of the United States of America for governmental purposes without payment of any royalties thereon or therefor.

FIELD OF THE INVENTION

The invention is related to the field of measuring tools gaps, particularly to improved tools for measuring the snubber gap in a resilient joint.

BACKGROUND OF THE INVENTION

Resilient mounts range in size and capacity but perform the essential function of absorbing vibration and displacement to protect the components at either side of the mount. Commonly a resilient mount is used to support an engine, motor, or generator on a chassis (such as a vehicle or ship) or other foundation or frame. The resilient joint insulates the chassis from vibration of the motor while at the same time insulating the motor from displacements caused by the motion of the chassis. Such resilient mounts generally have structural attachment members for mounting to a motor on one side and a chassis on the other, and bear a flexible material between the structural attachment members. The flexible material may be composed of rubber, rubber-like compounds, or other composite materials capable of absorbing vibration, and capable of compressing and/or expanding to absorb displacements between the mounted components. For illustrative example resilient mounts, see Vulkan's T Series resilient mounts as described on the Vullkan website at vulkan.com.

Resilient mounts usually have limiters to prevent displacement from exceeding a maximum displacement permitted by the requirements of the chassis and mounted motor. Such limiters may operate both radially, preventing excessive deflection off the axis of the mount, and vertically, preventing excessive displacement of the motor and chassis from and toward each other. Such limiter, or snubber, provides snubbing action, limiting the minimum allowed proximity of the motor and chassis, and thus the maximum permitted compression of the flexible material. When the mount experiences compression displacement and the motor and chassis move closer to each other, at the minimum of proximity the snubber prevents further compression and the motor and chassis can approach no closer to each other. The maximum displacement of the resilient mount is provided by the snubber gap, the gap between the snubber and the foundation on which the resilient mount is mounted.

Snubber gaps are therefore an essential measurement on resilient mounts because they correspond to the maximum amount of compressive displacement allowed by the mount. Without a snubber gap the mount is effectively no longer resilient. Depending on the application and the position of the resilient mount within a larger structure, it may be difficult to measure the snubber gap of a resilient mount to ensure proper operation. Many resilient mounts are therefore designed with a small window, e.g., 2 mm, on one side of the resilient mount to accommodate a correspondingly small gauge, a Go/No-Go gauge, to verify the presence of a gap. Such a method is insufficient for two reasons. First, it only permits confirmation of the minimum gap size. But it is possible that the snubber gap could be too large, allowing for excessive displacement, resulting in damaged machinery. The Go/No-Go gauge would give a false "Go" reading. Second, as is true of any Go/No-Go gauge, it fails to provide an actual measurement value associated with the snubber gap. A more precise measurement is desirable for the purposes of comparison between units, long term trending, and maintenance of optimum performance of the resilient mount.

The art is in need of improved snubber gap measurement tools for measuring the snubber gap in a resilient mount with advantages over, and without the disadvantages of, conventional designs.

SUMMARY OF THE INVENTION

Having observed the aforementioned problems with conventional snubber gap Go/No-Go gauges, the inventor hereof provides an improved snubber gap measurement gauge tool and a set thereof with a range of measuring lengths. One advantage of the tool of the present invention is that the internal gap can be measured within a desired precision and recorded. The tool features a stem having small thickness, allowing for planar insertion in the resilient mount's inspection window. At one end of the stem is a handle for holding and manipulating the tool. The other end of the tool, which is inserted in the inspection window of the resilient mount, features a flag extending laterally coplanar with the plane of insertion. The flag has a desired extension from the axis of the tool such that when the tool is rotated 90 degrees in a key-turning motion, the flag extends toward the snubber. The gauge height, being the combined stem height plus flag height, provides for measurement of the snubber gap. With a set of such tools provided with flags ranging in extension height, the user may progress from smaller to larger tools until the snubber gap is smaller than the flag, which extends too far, and thus the tool is unable to be fully turned 90 degrees. The gauge height of the last tool allowing full 90 degree turning provides the approximate measurement of the snubber gap within the level of precision determined by the incremental difference in gauges.

Alternatively, the user may start with larger tools whose rotations are impeded, and proceed through successively smaller tools until reaching the tool whose gauge height permits free rotation. The gauge height of the first freely rotating tool provides the measurement of the snubber gap.

For example, a set of gauges of the invention may be constructed with stems having both thickness and height of 1 mm, the smallest member of the set being one which has no flag extension and thus measures 1 mm when turned 90 degrees. The next larger member of the set may have a flag extending in height 1 mm from the stem, thereby providing a total stem-plus-flag length of 3 mm, capable of measuring a snubber gap of 3 mm. Each successive member of the set of gauges may be constructed with incrementally larger flags such that the set may be capable of measuring up to 12 mm or 18 mm or more, depending on the nature of the resilient mount whose snubber gap is being measured. Alternative sets of such gauge tools of the invention may be constructed having smaller increments of 0.5 mm, allowing for more precise measurements of the snubber gap.

In one aspect, the invention is directed to a snubber gap measurement tool for measuring a snubber gap in a resilient mount, which has a handle attached to a proximal end of a stem. The stem has a longitudinal axis, a stem thickness, and a stem height equal to or greater than the stem thickness. The tool also has a flag having a flag height extending from a distal end of the stem, the flag extending normal to the axis of the stem. The tool has a gauge height equal to the sum of the stem height and flag height. Upon insertion into an inspection window of the resilient mount, the snubber gap measurement tool may be rotated such that its gauge height provides a measure of the snubber gap. If the snubber gap measurement tool may be rotated ninety degrees after the insertion without encountering resistance, then the snubber gap is larger than the gauge height; but if the snubber gap measurement tool may not be rotated ninety degrees after the insertion due to resistance, then the snubber gap is smaller than the gauge height.

In some aspects, the handle is labeled with the gauge height. The flag may be triangular with a vertex of the triangle being displaced from the stem by the flag height. In other aspects the stem has a cross section which may be square, rectangular, circular, and elliptical. In one aspect, the handle, the stem, and the flag are the same thickness, while in other aspects the handle is thicker than the stem and/or the flag is thinner than the stem.

In one aspect the snubber gap measurement tool is constructed from a material such as metals, metal alloys, carbon fiber, resins, composites, acrylics, plastics, thermoplastics, thermoplastic polymers, and biopolymers. In other aspects, the tool is fabricated from aluminum, stainless steel, or titanium. In yet other aspects the tool is constructed by additive manufacturing.

In some aspects, a series of snubber gap measurement tools having different gauge heights may be collected together to form a tool set. The gauge heights may differ by a specific increment. In one aspect, the gauge heights differ by an increment of one millimeter while in other aspects the gauge heights differ by an increment of one half millimeter. In some aspects the tool set may have 10-20 tools, differing in gauge height by one half or one millimeter. The tool sets may also have a flagless tool having a gauge height equal to its stem height.

In some aspects, the invention provides a method of measuring the size of a snubber gap of a resilient mount by progressively inserting a series of snubber gap measurement tools in a flat orientation into an inspection window of the resilient mount until the flag is situate in the snubber gap. The user then attempts to rotate each of the snubber gap measurement tools ninety degrees to an upright orientation. The user may determine the size of the snubber gap to be in the range between the gauge heights of (i) the snubber gap tool with the largest gauge height which allows ninety degree rotation without resistance, and (ii) the snubber gap tool with the smallest gauge height which encounters resistance upon attempting rotation.

These and other aspects of the invention will be readily appreciated by those of skill in the art from the description of the invention herein.

BRIEF DESCRIPTION OF THE DRAWINGS

FIG. 2 depicts an embodiment of the invention illustrating the use of a snubber gap measurement tool having a specified gauge height.

DETAILED DESCRIPTION OF THE INVENTION

Figure 1:
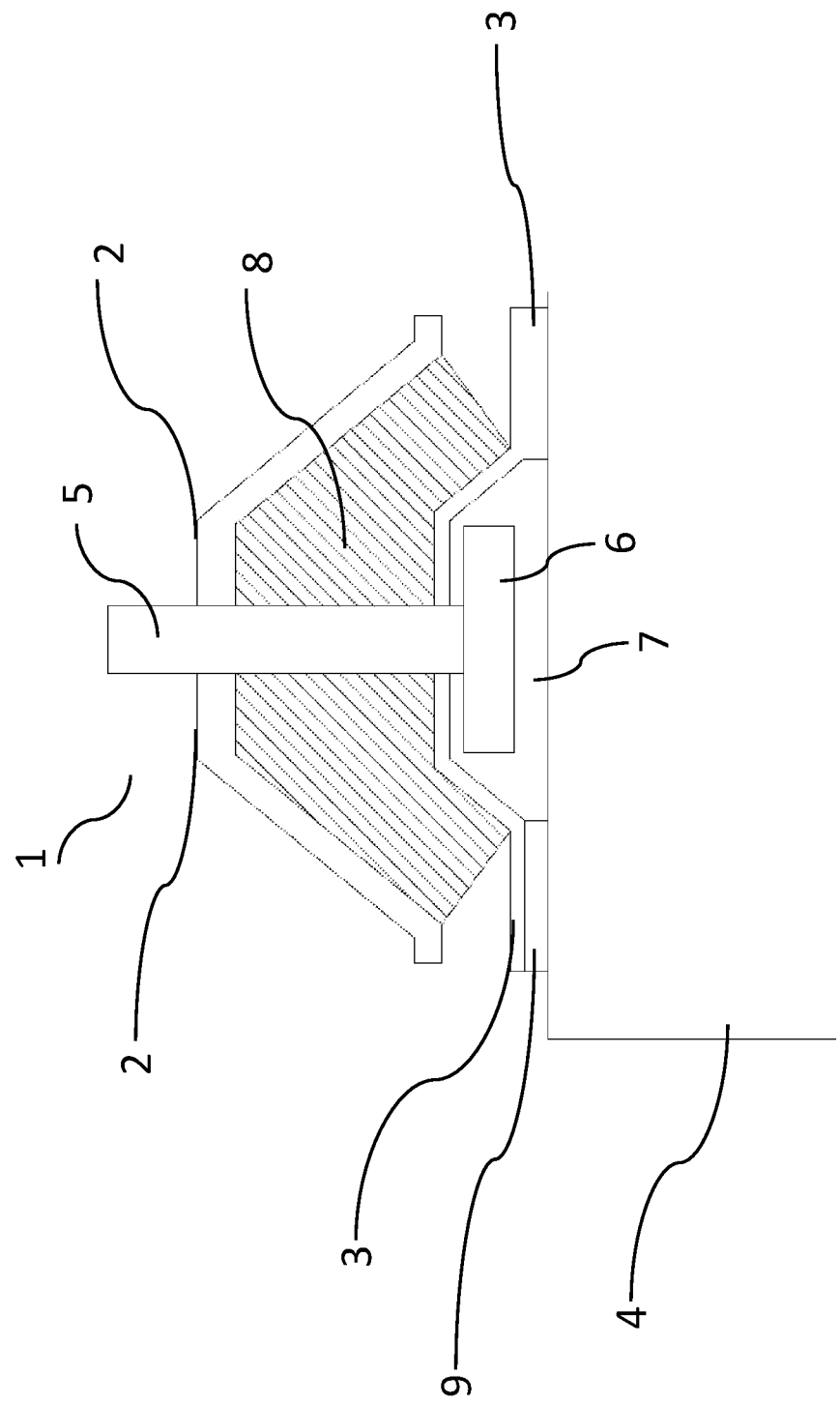
FIG. 1 depicts a cross section of a typical resilient mount.

With reference to the Figures, FIG. 1 illustrates a typical resilient mount such as a Vulkan T35, the resilient mount 1 having an upper mounting member 2 for attaching to a motor or the like, and a lower mounting member 3 for attaching to a chassis or foundation 4 or the like. Flexible material 8 insulates from vibration and displacement. A snubber comprising a centralized cylindrical limiter 5 and a puck 6 restricts radial and vertical displacements. The snubber gap 7 is the void between the lower edge of the puck and the upper edge of the foundation 4. An inspection window 9 is provided allowing inspection of the snubber gap.

FIG. 2 illustrates the snubber gap measurement tool 10 of the invention and its use with a resilient mount 1. The tool 10 has a handle 11 at one end, a flag 13 at the other end, and a stem 12 spanning from the handle 11 to the flag 13. The stem 12 in cross section may be square, rectangular, round, or another profile, so long as its maximum dimension is smaller than the height of the inspection window 9. The handle 11 is optionally provided with a label 14 stating the precise dimension of the sum of the height of the flag 13 plus the height of the stem 12. The handle 11 may be any shape convenient for holding by the user. In some embodiments, the handle 11 is square, while in others it is rectangular, triangular, circular, oval, or other sutable shapes. In some embodiments, the handle 11 is the same thickness as the stem 12, while in others embodiments it may be greater or lesser in thickness as the stem 12.

A tool 10 with a flag having zero height (or in other words, with no extension flag) may be included in a set of tools 10 as the smallest tool 10 of any set of such tools 10 such that the height of the stem itself (as measured in the upright position) provides the measurement of the snubber gap.

Figure 2A:
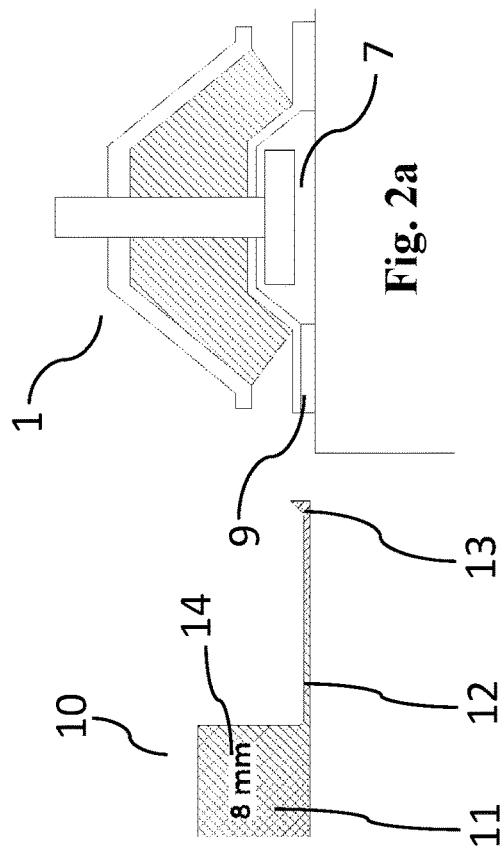
FIG. 2*a* shows the snubber gap measurement tool in a vertical upright orientation.
Figure 2B:
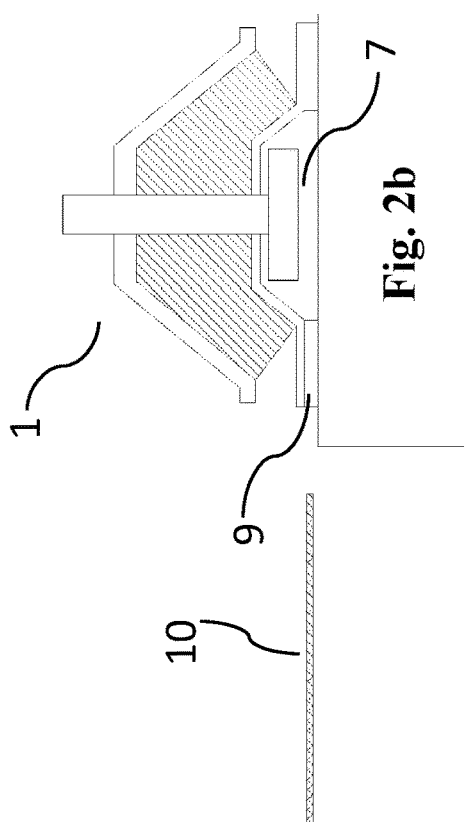
FIG. 2*b* shows the snubber gap measurement tool in a flat orientation.
Figure 2C:
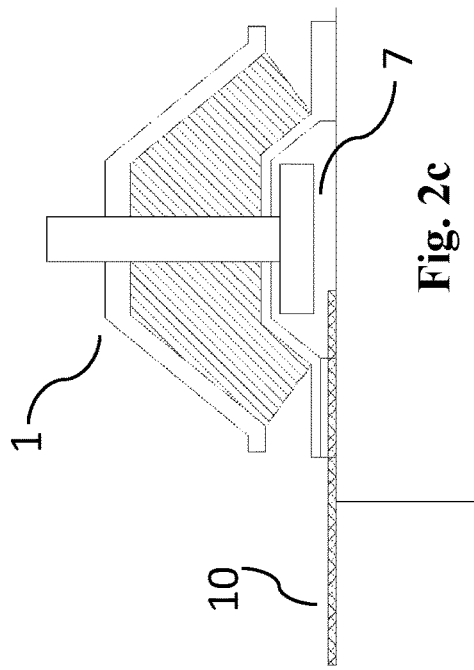
FIG. 2*c* shows the snubber gap measurement tool in a flat orientation following insertion into the inspection window of a resilient mount.
Figure 2D:
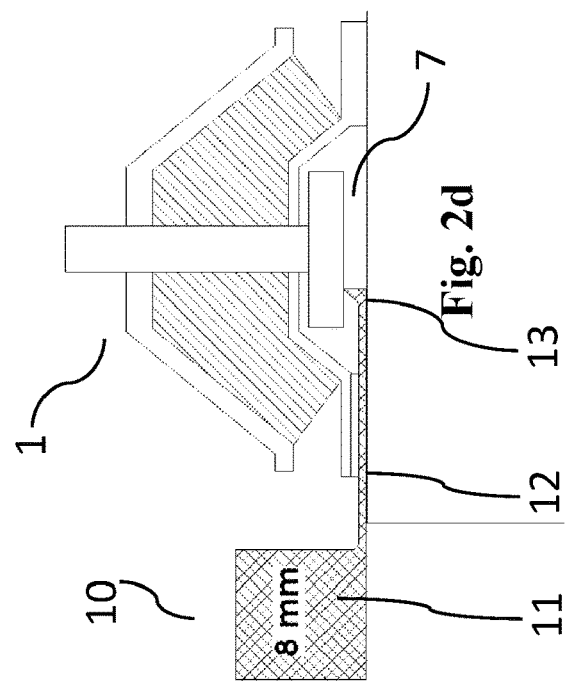
FIG. 2*d* shows the snubber gap measurement tool following insertion into the inspection window and rotation to a vertical upright position.

To use the tool 10, the user locates the inspection window 9 at the bottom of the resilient mount 1. FIG. 2*a* shows the tool 10 in its fully vertical upright orientation. Grasping the handle 11, the user manipulates the tool 10 in a first rotation 90 degrees about its long axis to place the tool 10 in its flat orientation, as shown in FIG. 2*b*, such that its thickness is less than the height of the inspection window 9. The tool 10 may then be inserted into and through the inspection window 9 as shown in FIG. 2*c*. The stem 12 is sufficiently long such that the flag 13 may be positioned to be situate within the snubber gap 7 when the tool 10 is inserted through the inspection window 9. The user then manipulates the tool 10 in a second rotation of 90 degrees about its long axis, opposite to the direction it was rotated previously, to return it to its original vertical upright orientation. FIG. 2*d* shows the tool 10 rotated back to its original upright orientation, and illustrates the flag 13 fully filling and measuring the snubber gap 7.

If the rotation after insertion can be completed unimpeded, then the snubber gap is larger than the combined height of the flag 13 plus stem 12 at the distal end of the tool 10. When the post-insertion rotation is met with resistance, the snubber gap 7 is smaller than the combined height of the flag 13 plus stem 12 dimension at the distal end of the tool 10. By repeating the insertion and rotation steps with progressively larger tools 10, the snubber gap 7 can be measured to a precision within the incremental difference between the tools 10 of the tool set.

In some embodiments, the flag 13 has the same thickness as the stem 12, while in other embodiments the flag 13 has a thickness less than that of the stem. In some embodiments the flag 13 is triangular shaped with a vertex extending furthest from the stem, while in other embodiments the flag 13 may be rectangular or another suitable shape with a measurable maximum extension from the stem.

While the procedure has been described for convenience beginning with the tool 10 upright, those of skill in the art will appreciate that in practice the user would conduct the measurement procedure by choosing a smaller tool 10, orienting it in its flat orientation, inserting through the inspection window 9, rotating the tool 10 90 degrees to the upright orientation, then repeating with successively larger tools 10 until rotation encounters resistance. Alternatively, the user may start with a larger tool 10 expecting rotation to meet resistance, and then progressing through successively smaller tools 10 until such resistance disappears. Using either approach the user may achieve measurement of the snubber gap 7.

The tools 10 of the invention may be constructed from a wide variety of materials, including any sufficiently rigid materials capable of maintaining structural integrity through a rotation and providing feedback to a user upon resistance. For example, the tools 10 may be fabricated from metals, such as aluminum, copper, and the like; alloys, such as steel and stainless steel; carbon fiber; resins; composites; acrylics; plastics, thermoplastics, thermoplastic polymers, and biopolymers; and other suitable materials. The tools 10 of the invention may be constructed by additive manufacturing (i.e., 3D printing) using such materials as described.

More precise measurements of snubber gaps are desirable for the purposes of comparison between units, long term trending, and maintenance of optimum performance of the resilient mount. Those of skill in the art will readily appreciate that the components of the may be chosen to achieve particularly desired results in particular applications.

EXAMPLES

The following Examples serve to illustrate the present invention and are not intended to limit its scope in any way.

Example 1—A Set of Snubber Gap Measurement Tools

Snubber gap measurement tools 10 as shown in FIG. 2 were constructed by additive manufacturing from the thermoplastic polymer polylactic acid (PLA). The tools 10 had a thickness of 3 mm, the handle 11 was 50 mm×50 mm square, and the stem 12 was 100 mm. The overall length of the tool 10 was thus 150 mm. The stem was square in cross sectional profile. A set of tools 10 was constructed with extension flags in 1 mm increments, such that the full set comprised 9 tools, providing flag-plus-stem heights ranging from 4 mm to 12 mm. Inserting the tools 10 into a Vulkan T35 resilient mount progressively from smaller to larger, the 8 mm tool was found to be the largest that would rotate with no resistance. The snubber gap was thus measured to be within the range of greater than 8 mm but less than 9 mm.

Additional tools without flags and with smaller stem heights were crafted to supplement the set of tools 10 described in this Example. These additional tools provided stem heights as measured in the upright position of 1 mm, 2 mm, and 3 mm. The supplemented tool set thus comprised 12 tools in total, and was capable of measuring snubber gaps between 1 and 12 mm within 1 mm of precision. If desired, additional tools 10 may be constructed featuring larger flags for measuring larger snubber gaps.

Example 2—A Set of Snubber Gap Measurement Tools

Snubber gap measurement tools 10 as shown in FIG. 2 are constructed from stainless steel. The tools 10 have a thickness of 1 mm, the handle 11 is 25 mm×25 mm square, and the stem 12 is 100 mm. The overall length of each tool 10 is 125 mm. The stem is rectangular in cross sectional profile, the aforementioned thickness of 1 mm by a height of 2 mm. A set of tools 10 is constructed, the first without a flag, and another 11 with extension flags in 1 mm increments, such that the full set comprises 12 tools. The smallest, flagless, tool may be used to measure snubber gaps as small as 2 mm, while the additional 11 tools 10 provide gauge heights ranging from 3 mm to 13 mm. Such a tool set may be used to measure the snubber gap in a variety of resilient mounts.

Example 3—A Set of Snubber Gap Measurement Tools

Snubber gap measurement tools 10 as shown in FIG. 2 are constructed from aluminum. The tools 10 have a thickness of 3 mm, the handle 11 is 50 mm×50 mm square, and the stem 12 is 100 mm. The overall length of each tool 10 is 150 mm. The stem is square in cross sectional profile, the aforementioned thickness of 3 mm by a height of 3 mm. A set of tools 10 is constructed with extension flags in 1 mm increments, such that the full set comprises 12 tools. The smallest has a gauge height of 4 mm, while the remaining 11 tools 10 provide gauge heights ranging from 5 mm to 15 mm. Such a tool set may be used to measure the snubber gap in a variety of resilient mounts.

Example 4—A Set of Snubber Gap Measurement Tools

Snubber gap measurement tools 10 as shown in FIG. 2 are constructed from titanium. The tools 10 have a thickness of 2 mm, the handle 11 is 50 mm×50 mm square, and the stem 12 is 100 mm. The overall length of each tool 10 is 150 mm. The stem is square in cross sectional profile, the aforementioned thickness of 2 mm by a height of 2 mm. A first tool is constructed without a flag. A set of tools 10 is constructed with extension flags in 0.5 mm increments, such that the full set comprises 21 tools ranging in gauge height from 2 mm to 12 mm in increments of 0.5 mm, enabling measurement of the snubber gap in a variety of resilient mounts to a precision within 0.5 mm.

The present invention is not to be limited in scope by the specific embodiments described above, which are intended as illustrations of aspects of the invention. Functionally equivalent methods and components are within the scope of the invention. Various modifications of the invention, in addition to those shown and described herein, will be readily apparent to those skilled in the art from the foregoing description. Such modifications are intended to fall within the scope of the appended claims. All cited documents are incorporated herein by reference.

What is claimed is:

1. A snubber gap measurement tool for measuring a snubber gap in a resilient mount, comprising:
   a handle attached to a proximal end of a stem, the stem having a longitudinal axis, a stem thickness, and a stem height equal to or greater than the stem thickness; and
   a flag having a flag height extending from a distal end of the stem, the flag extending normal to the axis of the stem;

a gauge height equal to the sum of the stem height and flag height;

wherein, upon insertion into an inspection window of the resilient mount, the snubber gap measurement tool may be rotated such that its gauge height provides a measure of the snubber gap.

2. The snubber gap measurement tool of claim 1, wherein:

if the snubber gap measurement tool may be rotated ninety degrees after the insertion without encountering resistance, then the snubber gap is larger than the gauge height; and if the snubber gap measurement tool may not be rotated ninety degrees after the insertion due to resistance, then the snubber gap is smaller than the gauge height.

3. The snubber gap measurement tool of claim 1, wherein the handle is labeled with the gauge height.

4. The snubber gap measurement tool of claim 1, wherein the flag is triangular with a vertex of the triangle being displaced from the stem by the flag height.

5. The snubber gap measurement tool of claim 1, wherein the stem has a cross section is selected from the group consisting of square, rectangular, circular, and elliptical.

6. The snubber gap measurement tool of claim 1, wherein the handle, the stem, and the flag are the same thickness.

7. The snubber gap measurement tool of claim 1, wherein the handle is thicker than the stem.

8. The snubber gap measurement tool of claim 1, wherein the flag is thinner than the stem.

9. The snubber gap measurement tool of claim 1, wherein the snubber gap measurement tool is constructed from a material selected from the group consisting of metals, metal alloys, carbon fiber, resins, composites, acrylics, plastics, thermoplastics, thermoplastic polymers, and biopolymers.

10. The snubber gap measurement tool of claim 9, wherein the snubber gap measurement tool is constructed from aluminum.

11. The snubber gap measurement tool of claim 9, wherein the snubber gap measurement tool is constructed from stainless steel.

12. The snubber gap measurement tool of claim 9, wherein the snubber gap measurement tool is constructed by additive manufacturing.

13. A tool set comprising a plurality of snubber gap measurement tools of claim 1, wherein each of the plurality of snubber gap measurement tools has a different gauge height.

14. The tool set of claim 13, wherein the gauge heights differ by an increment of one millimeter.

15. The tool set of claim 13, wherein the gauge heights differ by an increment of one half millimeter.

16. The tool set of claim 13, further comprising a flagless tool having a gauge height equal to the stem height.

17. The tool set of claim 13, wherein the tool set has 12 tools with gauge heights differing by one millimeter.

18. A method of measuring the size of a snubber gap of a resilient mount, the method comprising:

progressively inserting a series of snubber gap measurement tools of claim 1 in a flat orientation into an inspection window of the resilient mount until the flag is situate in the snubber gap;

attempting to rotate each of the snubber gap measurement tools ninety degrees to an upright orientation;

determining the size of the snubber gap to be in the range between the gauge heights of (i) the snubber gap tool with the largest gauge height which allows ninety degree rotation without resistance, and (ii) the snubber gap tool with the smallest gauge height which encounters resistance upon attempting rotation.

\* \* \* \* \*